(12) United States Patent
Nagashima (10) Patent No.: US 6,393,822 B2
(45) Date of Patent: May 28, 2002

(54) COOLING STEAM SUPPLY METHOD OF A COMBINED CYCLE POWER GENERATION PLANT

(75) Inventor: Takayuki Nagashima, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/866,621

(22) Filed: May 30, 2001

Related U.S. Application Data (62) Division of application No. 09/016,726, filed on Jan. 30, 1998, now Pat. No. 6,263,662.

(30) Foreign Application Priority Data

Jan. 31, 1997 (JP) .............................................. 9-019528

(51) Int. Cl.[7] ................ F02C 6/18; F02C 7/18
(52) U.S. Cl. ................ 60/39.02; 60/39.141; 60/39.182; 60/39.75
(58) Field of Search .......................... 60/39.02, 39.141, 60/39.182, 39.75; 122/7 B (56) References Cited

U.S. PATENT DOCUMENTS

| | | | |
|---|---|---|---|
| 4,288,979 A | * 9/1981 | Liljedahl et al. | ......... 60/39.182 |
| 5,044,163 A | * 9/1991 | Bruckner et al. | ......... 60/39.182 |
| 5,379,588 A | * 1/1995 | Tomlinson et al | ....... 60/39.182 |
| 5,428,950 A | * 7/1995 | Tomlinson et al. | ....... 60/39.182 |
| 5,471,832 A | * 12/1995 | Sugita et al. | ............ 60/39.141 |
| 5,491,971 A | * 2/1996 | Tomlinson et al. | ....... 60/39.182 |
| 5,577,377 A | * 11/1996 | Tomlinson | ................ 60/39.182 |
| 5,628,179 A | * 5/1997 | Tomlinson | ................ 60/39.182 |
| 5,660,799 A | * 8/1997 | Motai et al. | .............. 60/39.182 |
| 5,755,089 A | * 5/1998 | Vanselow | ................. 60/39.182 |
| 6,263,662 B1 | * 7/2001 | Nagahima | ................ 60/39.182 |

* cited by examiner

*Primary Examiner*—Ted Kim
(74) *Attorney, Agent, or Firm*—Oblon, Spivak, McClelland, Maier & Neustadt, P.C.

(57) ABSTRACT

A combined cycle power generation plant includes a gas turbine plant, a steam turbine plant operatively connected to the gas turbine plant, an exhaust gas heat recovery boiler for generating steam for driving the steam turbine plant by an exhaust gas of the gas turbine plant, an evaporator unit accommodated in the exhaust gas heat recovery boiler, the evaporator unit being divided into a first evaporator and a second evaporator, and a superheater provided for at least one of an intermediate portion between the first evaporator and the second evaporator and a portion on a downstream side of the second evaporator.

6 Claims, 8 Drawing Sheets

COOLING STEAM SUPPLY METHOD OF A COMBINED CYCLE POWER GENERATION PLANT

This application is a division of application Ser. No. 09/016,726 filed on Jan. 30, 1998, now U.S. Pat. No. 6,263,662.

BACKGROUND OF THE INVENTION

1. Field of the Invention

The present invention relates to a combined cycle power generation plant capable of setting a steam generated from an exhaust gas heat recovery boiler to a proper temperature and supplying the steam to a steam turbine plant while supplying the steam generated from the exhaust gas heat recovery boiler to a gas turbine plant as a cooling steam, and also relates to a cooling steam supply method for the combined cycle power generation plant.

2. Description of the Related Art

In recent years, a study and development for obtaining high power and achieving high heat efficiency has been made in a combined cycle power generation plant. With the study and development, there has been made a plan to raise a combustion gas temperature of at least a portion of a gas turbine inlet from a temperature of 1300° C., obtained in the prior art, to a temperature of 1500° C. or more.

In the case of creating a high temperature of the combustion gas of the gas turbine inlet, for example, a high chromium steel has been conventionally used as a component of a gas turbine plant, and part of the compressed air from an air compressor has been supplied to the component of the gas turbine plant as a cooling medium. However, in the prior art as described above, the strength of the component has been close to its limit. For this reason, in order to discover a cooling medium substituting for the compressed air used in the prior art, it has been attempted to study and develop a new cooling medium to be supplied to the components of the gas turbine plant, and steam has been selected as one of the cooling medium. A combined cycle power generation plant which takes advantage of steam cooling has been already disclosed in, for example, Japanese Laid-Open Patent Publication Nos. 5-163960 and 6-93879.

Steam has a higher specific heat as compared with compressed air and is adapted to an absorption of heat generated in components, for example, in a gas turbine stationary blade and a movable blade, accompanying with high temperature of the gas turbine plant. However, each of the gas turbine stationary blade and the movable blade has a structure in which a complicatedly meandering narrow passage is defined in the interior of these blades. For this reason, if impurities such as silica or the like are contained in a steam passing through the above passage, unbalanced cooling occurs because of the possibility of clogging the passage with silica or the like. As a result, these blades are broken down due to thermal strain accompanying the unbalanced cooling. Therefore, cooling steam is required having a high cleanliness factor.

Further, in the case where a cooling steam is supplied to components of the gas turbine plant, it is necessary to provide a steam supply source which can supply a steam of proper temperature. If not so, the component of the gas turbine plant generates an excessive thermal stress resulting from the difference in temperature between a combustion gas as a driving fluid and these components, which difference may result in a possibility that these components are broken down. For this reason, in the components of the gas turbine plant, a steam supply source, which can supply a steam of proper temperature, is securely required.

On the other hand, with a temperature of the gas turbine plant being high, a steam supplied from the exhaust gas heat recovery boiler to a steam turbine plant also has a high temperature. In this case, if the steam temperature is too high, an excessive thermal stress is generated in the steam turbine plant, and as a result, it becomes difficult to maintain a material strength of the components of the steam turbine plant. For this reason, in the steam turbine plant, it is necessary to provide a steam supply source which can supply a steam of a proper temperature.

As described above, in the combined cycle power generation plant, a first high pressure superheater of the exhaust gas heat recovery boiler is selected and set as a steam supply source, taking into consideration the cleanliness of cooling steam, supply of proper temperature steam, and technical matters indispensable to the gas turbine and steam turbine plant. As one example, a combined cycle power generation plan as shown in FIG. 6 has been already proposed.

Figure 6:
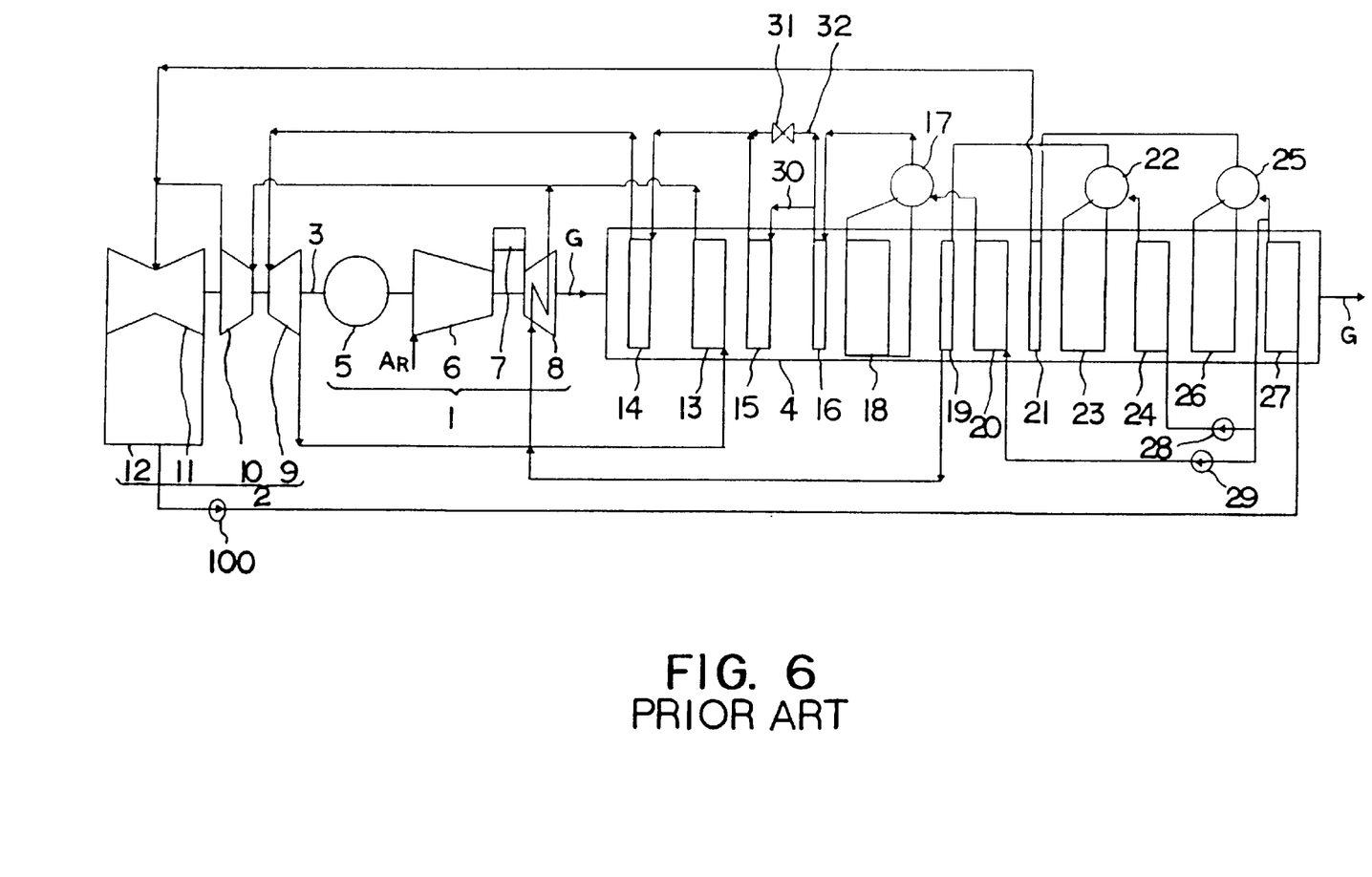
FIG. 6 is a schematic system diagram showing a combined cycle power generation plant of the prior art.

The combined cycle power generation plant shown in FIG. 6 has an arrangement in which a gas turbine plant 1 and a steam turbine plant 2 are combined by a common rotary shaft 3 and an exhaust gas heat recovery boiler 4 is located independently from these plants.

The gas turbine plant 1 includes a generator 5, an air compressor 6, a combustor 7 and a gas turbine 8. Air AR sucked by the air compressor 6 is made into a high pressure compressed air, and is guided to the combustor 7. In the combustor 7, a fuel is added to the compressed air so that a combustion gas is generated, and then, the combustion gas is expanded by the gas turbine 8, thus the generator 5 is driven by the power generated in the above manner.

The steam turbine plant 2 includes a high pressure turbine 9, an intermediate pressure turbine 10, a low pressure turbine 11 and a condenser 12. An exhaust steam, after being expanded by the high pressure turbine 9, is led to a reheater 13 of the exhaust gas heat recovery boiler 4 and is superheated therein. Then, the exhaust steam is led to the intermediate pressure turbine 10 and is expanded as a reheat steam. Further, the exhaust steam is again expanded by the low pressure turbine 11, and thereafter, is condensed into a condensate by the condenser 12. The condensate is supplied as a feed water to the exhaust gas heat recovery boiler 4 via a pump 100.

Meanwhile, the exhaust gas heat recovery boiler 4 is provided with a third high pressure superheater 14, the reheater 13, a second high pressure superheater 15, a first high pressure superheater 16, a high pressure evaporator 18 including a high pressure drum 17, an intermediate pressure superheater 19, a high pressure economizer 20, a low pressure superheater 21, an intermediate pressure evaporator 23 including an intermediate pressure drum 22, an intermediate pressure economizer 24, a low pressure evaporator 26 including a low pressure drum 25, and a low pressure economizer 27. These components or elements are arranged in order from an upstream side toward a downstream side along a flow of an exhaust gas G of the gas turbine plant 1, and steam is generated through the heat exchanging operation between each heat exchanger and the exhaust gas G.

Specifically, in the exhaust gas heat recovery boiler 4, a feed water supplied from the condenser 12 of the steam turbine plant 2 via the pump 100 is preheated by the low pressure economizer 27 and is led to the low pressure drum 25. Then, by taking advantage of a difference in density of drum water, the feed water is circulated through the low pressure evaporator 26 to generate steam, and the generated steam is supplied to the low pressure turbine 11 via the low pressure superheater 21.

The low pressure economizer 27 leads part of the feed water, which is diverted (divided) on an outlet side of the economizer 27, to the low pressure drum 22 by a low pressure pump 28 and the intermediate pressure economizer 24. Due to a difference in density of drum water, a part of the saturated water is circulated through the low pressure evaporator 23 to generate steam, and then, the generated steam is supplied to the gas turbine plant 1 via the intermediate pressure superheater 19 so as to cool the components of the gas turbine 8.

Further, the low pressure economizer 27 leads the remaining feed water to the high pressure drum 17 by a high pressure pump 29 and the high pressure economizer 20. Then, the remaining saturated water is circulated through the high pressure evaporator 18 to generate steam, and the generated steam is led to the first high pressure superheater 16.

This first high pressure superheater 16 includes a steam pipe 30 for leading steam to the second high pressure superheater 15, and a bypass pipe 32 between which a bypass valve 31 is interposed. Steam passed through the bypass pipe 32 is joined together with a superheated steam generated by the second high pressure superheater 15, and after the temperature of the steam has been decreased to a proper temperature, the steam is supplied to the high pressure turbine 9 of the steam turbine plant 2 via the third high pressure superheater 14.

As described above, in the known combined cycle power generation plant, in the case where steam is supplied from the exhaust gas heat recovery boiler 4 to the high pressure turbine 9, the first high pressure superheater 16 is set as the steam supply source. When the steam generated from the first high pressure superheater 16 is made into a superheated steam by the second high pressure superheater 15, the steam temperature is decreased by the bypass pipe 32, and then, the superheated steam having a proper temperature is supplied from the third high pressure superheater 14 to the high pressure turbine 9.

Moreover, when supplying a cooling steam to the components of the gas turbine 8, in the exhaust gas heat recovery boiler 4, a superheated steam generated by the intermediate pressure superheater 19 and an exhaust steam of the high pressure turbine 9 are joined together, and then, the joined steam is supplied to the gas turbine 8 so that the strength of the gas turbine members can be maintained so as to adapt to high temperature of a combustion gas on an inlet of the gas turbine 8. Further, a steam, which cooled the components of the gas turbine 8, is then led to the intermediate pressure turbine 10 together with a reheated steam of the reheater 13.

Figure 7:
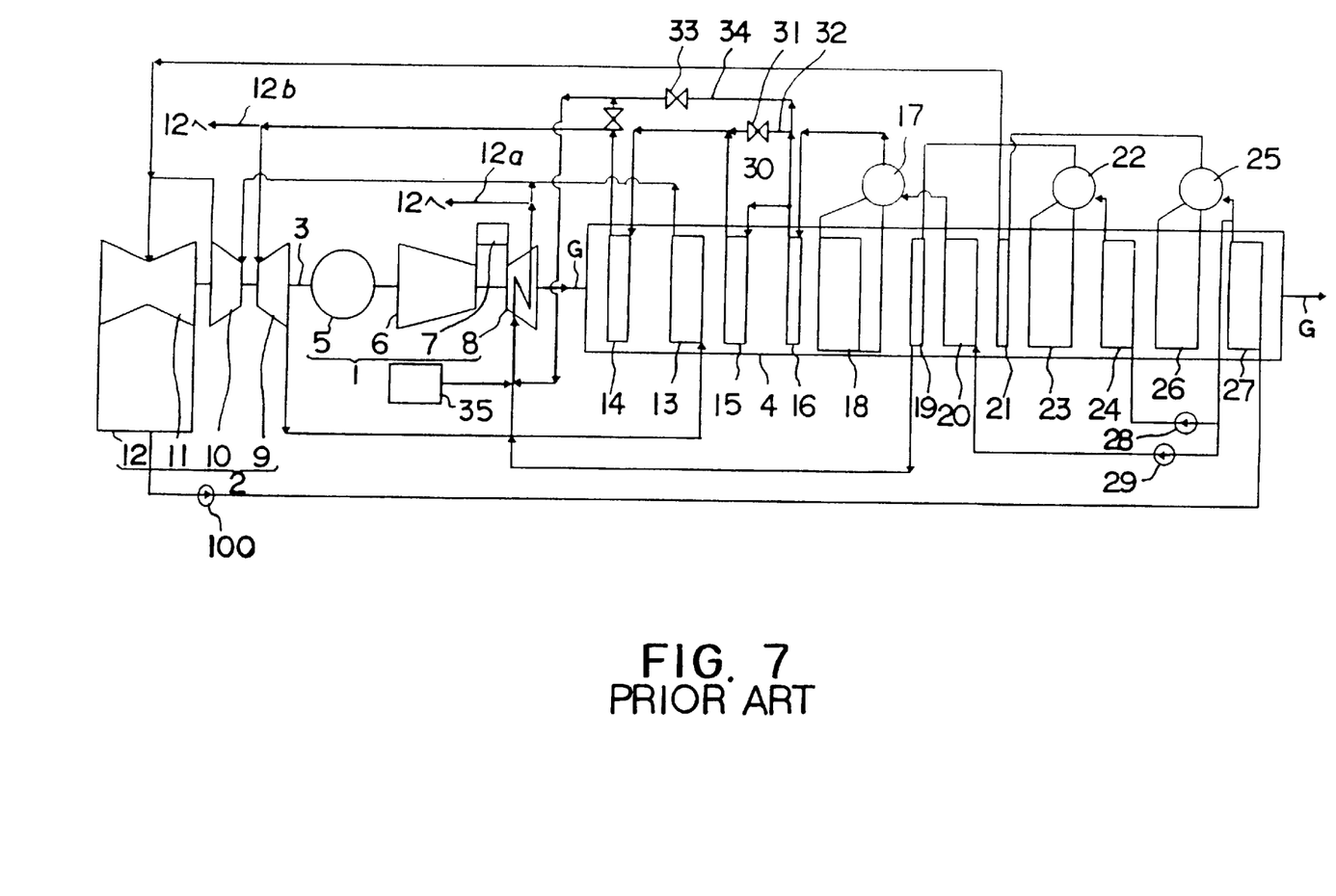
FIG. 7 is a schematic system diagram showing another combined cycle power generation plant in the prior art.

Meanwhile, in the combined cycle power generation plant shown in FIG. 6, during the start-up operation, the steam is still not generated from the exhaust gas heat recovery boiler, and for this reason, a cooling steam cannot be supplied to the gas turbine 8 from the intermediate pressure superheater 19 and the high pressure turbine 9. Thus, in order to cool the components of the gas turbine 8, there is the following plan for making use of the steam remaining in the high pressure drum 17 of the exhaust gas heat recovery boiler 4. Specifically, in this case, the exhaust gas heat recovery boiler 4 can make use of a residual heat of the first high pressure superheater 16, the second high pressure superheater 15 and the third high pressure superheater 14. Therefore, as shown in FIG. 7, an outlet side of the first high pressure superheater 16 is provided with a cooling steam pipe 34 which is arranged parallel to the bypass pipe 32 and includes a control valve 33.

The residual steam of the high pressure drum 17 is led to the first high pressure superheater 16 so as to be superheated, and then, part of the residual steam is guided to the second high pressure superheater 15 and the first high pressure superheater 14 while the remaining steam thereof is led to the cooling steam pipe 34. Subsequently, the two flows of steams are joined together on the outlet side of the third high pressure superheater 14, and a high-temperature portion of the gas turbine 8 is temporarily cooled by the joined steam. When the gas turbine plant 1 is in a high-load state, the components of the gas turbine 8 are cooled by the joined steam of the intermediate pressure superheater 19 and the high pressure turbine 9.

As described above, in the combined cycle power generation plant shown in FIG. 6, the known plan mentioned above has been performed such that a steam of a proper temperature is supplied from the exhaust gas heat recovery boiler 4 to the high pressure turbine 9 during the rated operation. However, when the gas turbine plant 1 is in a state of a partial load operation, the exhaust gas G supplied from the gas turbine 8 to the exhaust gas heat recovery boiler 4 is farther increased in its temperature.

Figure 8:
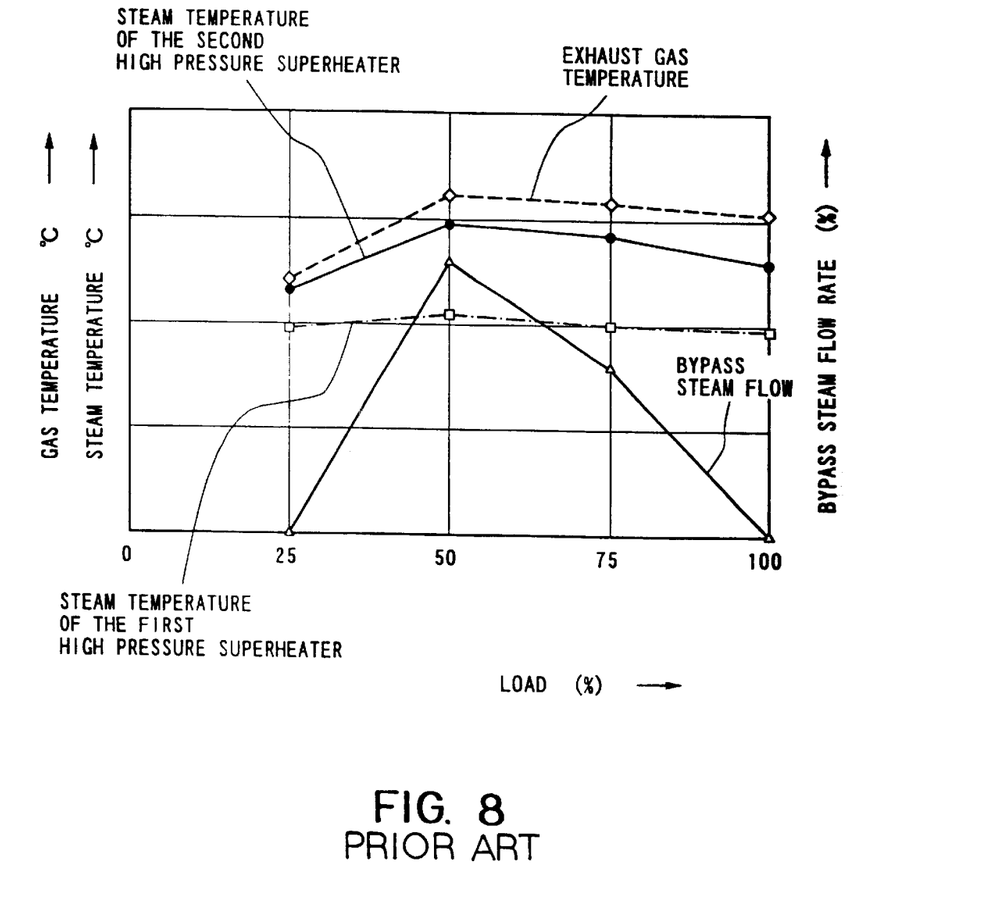
FIG. 8 is a graph showing a steam temperature and a bypass steam flow rate distribution with respect to a load variation in the prior art.

In general, in the case where the partial load operation of the gas turbine plant 1 is carried out, as shown by a broken line in FIG. 8, a temperature of the exhaust gas G rises. In contrast to the rising of the temperature of the exhaust gas G, the steam temperature of the first high pressure superheater 16 is substantially constant as shown by a dotted chain line in FIG. 8. On the other hand, the steam temperature of the second high pressure superheater 15 becomes high as shown by a solid line in FIG. 8. The steam temperature of the third high pressure superheater 14 rises, not shown, like the second high pressure superheater 15. In this case, the exhaust gas heat recovery boiler 4 sets the superheated steam of the third high pressure super heater 14 at a proper temperature and supplies it to the high pressure turbine 9. Thus, when supplying the superheated steam of the first high pressure superheater 16 to the third high pressure superheater 14 via the bypass pipe 32, a bypass steam flow rate is increased as shown by a solid line in FIG. 8. For this reason, a heat exchange quantity of the second high pressure superheater 15 is increased as the exhaust gas reaches high temperature. However, a steam quantity of any heated object remarkably decreases, and during the heat exchange, an excessive thermal stress is generated due to a biased temperature distribution. As a result, a problem is caused such that a heat transfer pipe is burned or broken down.

On the other hand, the combined cycle power generation plant shown in FIG. 7 is constructed as follows. Specifically, during a start-up operation, the outlet side of the first high pressure superheater 16 is provided with the cooling steam pipe 34 which is arranged parallel to the bypass pipe 32. Due to the steam remaining in the high pressure drum 17, the steam is led to the first high pressure superheater 15, which is used as a cooling steam supply source. Further, part of the steam is supplied to the cooling steam pipe 34 while the remainder thereof is supplied to the third high pressure superheater 14 via the second high pressure superheater 15. Subsequently, both the steam flows are joined together on the outlet side of the third high pressure superheater 14, and the joined steam is supplied to the gas turbine 8 so as to cool the components of the gas turbine 8.

However, even during the start-up operation, for example, when the gas turbine plant 1 is in a hot start or a very hot start state, a residual heat of each heat exchanger is still at a high temperature, and for this reason, there sometimes arises a case where the temperature of the cooling steam exceeds a proper cooling steam temperature of the gas turbine 8. In order to realize a proper temperature of the cooling steam, as shown in FIG. 7, it is necessary to locate a steam generating apparatus 35, which generates a steam having a relatively low temperature, on an inlet side of the gas turbine 8. However, this arrangement is not advantageous when the cost of facilities is considered.

In FIG. 7, the outlet side of the gas turbine 8 is provided with a first bypass pipe 12a connected to the condenser 12. Further, the inlet side of the high pressure turbine 9 is provided with a second bypass pipe 12b connected to the condenser 12.

As described above, in the known combined cycle power generation plants shown in FIGS. 6 and 7, the following plan has been made. Specifically, the first high pressure superheater 16, which generates steam having a stable temperature with respect to a load variation as shown in FIG. 8, is set as a steam supply source, and steam having a proper temperature is supplied to the high pressure turbine 9 therefrom while a cooling steam having a proper temperature is supplied to the gas turbine 8. Considering the details, however, the conventional combined cycle power generation plants have various problems as described above, and it is required to achieve improvements for sufficiently coping with the high temperature of the gas turbine plant.

SUMMARY OF THE INVENTION

A primary object of the present invention is to substantially eliminate defects or drawbacks encountered in the prior art mentioned above and to provide a combined cycle power generation plant which can stably supply steam having a proper temperature from an exhaust gas heat recovery boiler to a steam turbine plant even during a partial load operation of the turbine plant.

Another object of the present invention is to provided a combined cycle power generation plant which can supply a cooling steam having a proper temperature from an exhaust gas heat recovery boiler to a gas turbine plant even during a start-up operation.

A further object of the present invention is to provide a cooling steam supply method of a combined cycle power generation plant capable of supplying a cooling steam generated from an exhaust gas heat recovery boiler to another plant.

These and other objects can be achieved according to the present invention by providing, in one aspect, a combined cycle power generation plant comprising:

a gas turbine plant;

a steam turbine plant operatively connected to the gas turbine plant;

an exhaust gas heat recovery boiler for generating steam for driving the steam turbine plant by an exhaust gas of the gas turbine plant;

an evaporator unit accommodated in the exhaust gas heat recovery boiler, said evaporator unit being divided into a first evaporator disposed on an upstream side of an exhaust gas flow and a second evaporator disposed on a downstream side thereof; and a superheater unit provided at at least one of an intermediate position between the first evaporator and the second evaporator and a position on a downstream side of the exhaust gas flow of the second evaporator.

In preferred embodiments, the evaporator unit includes at least one low pressure evaporator and one high pressure evaporator of a pressure higher than that of the lower pressure evaporator and the superheater unit includes at least one low pressure superheater and one high pressure superheater of a pressure higher than that of the lower pressure superheater. The superheater unit is located adjacent to a portion, at which a superheated steam having a low degree of superheat is generated, at an intermediate portion between the first and second evaporators.

There is further provided with another superheater unit disposed on an upstream side of the first mentioned superheater unit and a bypass pipe connected to the first mentioned superheater unit and adapted to join a superheated steam generated from the another superheater unit to a superheated steam generated from the first mentioned superheater unit. The bypass pipe is provided with a bypass valve.

The superheater unit makes use of a superheated steam generated therefrom as a process steam for another plant. The superheater unit utilizes the generated superheated steam as a cooling steam for a gas turbine constituting a gas turbine plant.

The combined cycle power generation plant further comprises a steam supply means for supplying a steam composed of a steam from the exhaust gas heat recovery boiler and a steam from the steam turbine to the gas turbine plant as a cooling steam and a control means for controlling the steam supply of the steam supply means to the gas turbine plant.

In another aspect of the present invention, there is provided a cooling steam supply method of a combined cycle power generation plant, comprising a gas turbine plant, a steam turbine plant, a superheater, an evaporator unit and an exhaust gas heat recovery boiler having a drum, which are operatively connected together, in which a cooling steam is supplied from the drum of the exhaust gas heat recovery boiler to the gas turbine plant, said method comprising the steps of:

supplying a steam remaining in the exhaust gas heat recovery boiler to the gas turbine plant during a start-up operation thereof;

joining an exhaust steam generated from the steam turbine plant and a steam generated from the exhaust gas heat recovery boiler together after opening a steam turbine inlet valve and leading the steam to the steam turbine; and supplying the joined steam to the gas turbine plant as a cooling steam.

In performing the above method, in preferred embodiments, the evaporator unit is divided into two evaporators and the drum is a high pressure drum. Steam remaining in the high pressure drum is supplied to the superheater disposed at an intermediate portion between the divided two evaporators and a steam generated from the superheater is supplied to the gas turbine plant as a cooling steam. The superheater joins the steam generated therefrom and a steam generated from another superheater located on an upstream side of the first mentioned superheater when supplying the generated steam to the gas turbine plant as a cooling steam. The generated steam is supplied through a bypass pipe connected to the first mentioned superheater.

According to the characteristic features and structures of the present invention mentioned above, the high pressure evaporator is divided into two high pressure evaporators, and the first high pressure superheater is provided on a position where a superheated vapor having a relatively low degree of superheat is generated in the middle portion between these high pressure evaporators. Further, the superheated steam generated from the first high pressure superheater is controlled, and thereafter, is supplied to the high pressure turbine. Therefore, even during a partial load operation, the superheated steam can be supplied to the high pressure turbine as a driving steam having a proper temperature without specially providing temperature reducing means.

Further, in the cooling steam supply method of the combined cycle power generation plant according to the present invention, by making use of the steam of the high pressure drum, a superheated steam having a relatively low degree of superheat is generated by the first high pressure superheater, and then, the superheated steam is controlled and is supplied to the gas turbine. Therefore, even if during a start-up operation, steam is not still generated from each heat exchanger of the exhaust gas heat recovery boiler, a cooling steam having a proper temperature can be securely supplied to the components of the gas turbine.

Furthermore, in the combined cycle power generation plant according to the present invention, the superheated steam generated from the high pressure superheater is supplied to other plants as a process steam, so that an effective heat use can be achieved.

Still furthermore, according to the present invention, the superheater utilizes the generated superheated steam as a cooling steam for a gas turbine constituting the gas turbine plant.

The nature and further characteristic features of the present invention will be made clear from the following descriptions made with reference to the accompanying drawings.

DETAILED DESCRIPTION OF THE PREFERRED EMBODIMENTS

A first embodiment of the present invention will be described hereunder with reference to FIGS. 1 to 3.

Figure 1:
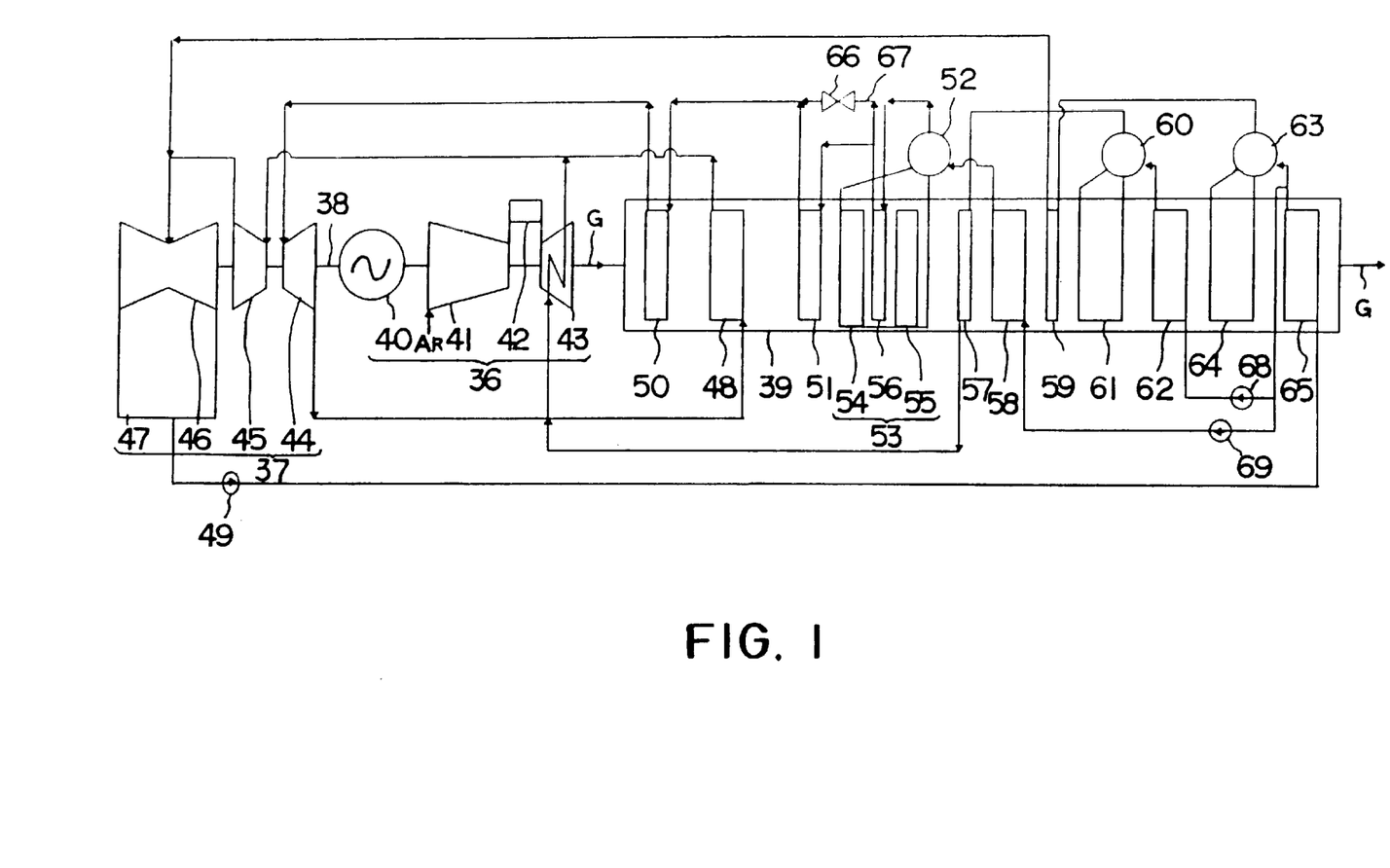
FIG. 1 is a schematic system diagram showing a combined cycle power generation plant according to a first embodiment of the present invention.

Referring to FIG. 1, the combined cycle power generation plant according to the first embodiment has a construction in which a steam turbine plant 37 is combined with a gas turbine plant 36 by a drive shaft 38 so that a cooling steam is supplied to the gas turbine plant 36, and an exhaust gas heat recovery boiler 39 which supplies a driving steam to the steam turbine plant 37 is provided independently from these plants.

The gas turbine plant 36 includes a generator 40, an air compressor 41, a combustor 42, and a gas turbine 43. Air AR sucked by the compressor 41 is made into a high pressure compressed air and is guided to the combustor 42. In the combustor 42, a fuel is added to the compressed air so that a combustion gas is generated, and then, the combustion gas is expanded by the gas turbine 43, thus the generator 40 is driven by the power generated in the above manner.

The steam turbine plant 37 includes a high pressure turbine 44, an intermediate pressure turbine 45, a low pressure turbine 46 and a condenser 47. An exhaust steam after being expanded by the high pressure turbine 44 is guided to a reheater 48 of the exhaust gas heat recovery boiler 39 and is heated therein. Then, the exhaust steam is led to the intermediate pressure turbine 45 and is expanded as reheated steam. Further, the exhaust steam is again expanded by the low pressure turbine 46, and thereafter, is condensed into a condensate by the condenser 47. The condensate is supplied as a feed water to the exhaust gas heat recovery boiler 39 via a pump 49.

Meanwhile, the exhaust gas heat recovery boiler 39 is provided with a third high pressure superheater 50, a reheater 48, a second high pressure superheater 51, a high pressure evaporator 53 including a high pressure drum 52, an intermediate pressure superheater 57, a high pressure economizer 58, a low pressure superheater 59, an intermediate pressure evaporator 61 including an intermediate pressure drum 60, an intermediate pressure economizer 62, a low pressure evaporator 64 including a low pressure drum 63, and a low pressure economizer 65. These component elements are arranged in order from an upstream side toward a downstream side along a flow of an exhaust gas G of the gas turbine plant 43. Steam is generated through the heat exchanging operation between each heat exchanger and the exhaust gas G. Further, a low pressure pump 68 supplies part of a saturated water of the low pressure economizer 65 to the intermediate pressure economizer 62, and a high pressure pump 69 supplies a remaining part of the saturated water of the low pressure economizer 65 to the high pressure economizer 58.

The high pressure evaporator 53 includes two divisional evaporators, that is, a second high pressure evaporator 54 and a first high pressure evaporator 55, and is further provided with a first high pressure superheater 56 which is arranged on a middle portion between the second high pressure evaporator 54 and the first high pressure evaporator 55. The first high pressure superheater 56 is provided on a middle portion between the second high pressure evaporator 54 and the first high pressure evaporator 55. The reason for taking the above arrangement is as follows.

Figure 2:
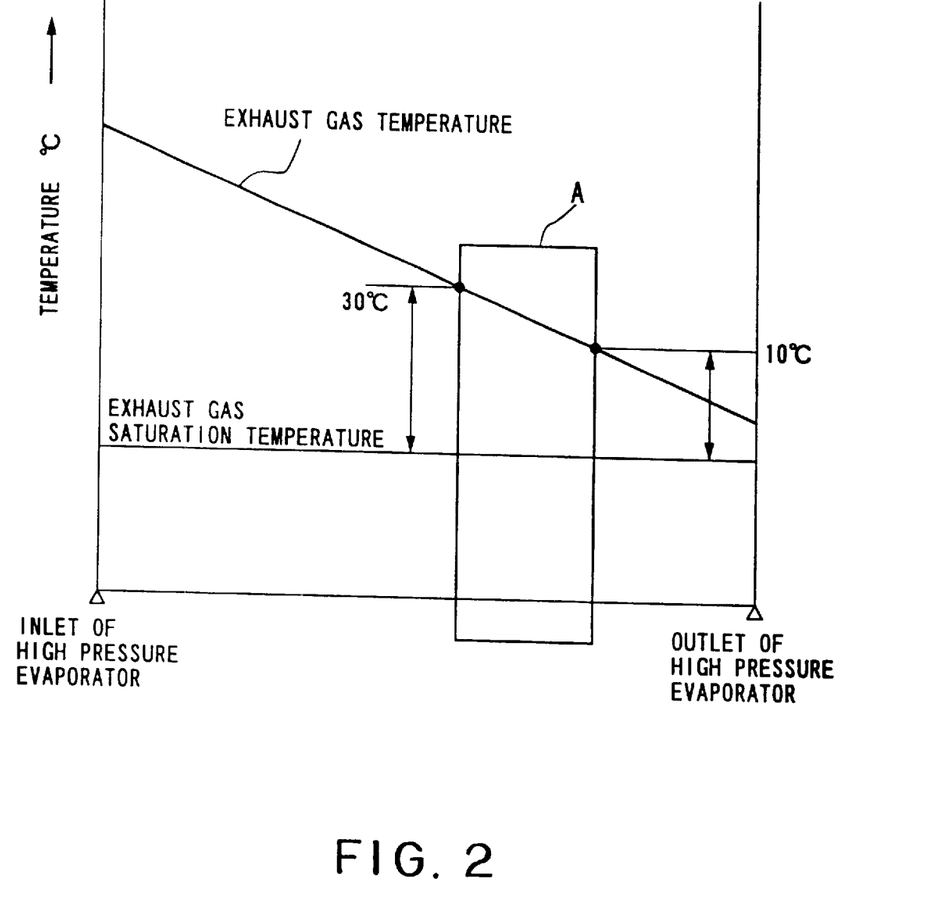
FIG. 2 is a view for explaining a position where a first high pressure superheater according to the present invention is located.

As shown in FIG. 2, it has been known that the exhaust gas G passing through the high pressure evaporator 53 has a saturation temperature of +170° C. on an inlet side of the high pressure evaporator 53, and the difference in saturation temperature becomes small on the downstream side from the central portion thereof. For this reason, in this first embodiment, if the first high pressure superheater 56 is provided in a region A where the exhaust gas has a saturation temperature of +30° C. to 10° C., it is possible to limit a degree of superheat of superheated steam generated from the first high pressure superheater 56 within a relatively low temperature range from 10° C. to 20° C. In this case, a pinch point of the superheated steam and exhaust gas G generated from the first high pressure superheater 56 is about 8° C. according to a test calculation. Further, in the case where the steam turbine plant 37 requires a superheated steam of a low degree of superheat such as 5° C. to 10° C., it is preferable that the first high pressure superheater 56 is provided on the downstream side of the first high pressure evaporator 55 which is one of the two divided evaporators of the high pressure evaporator 53.

An operation of the combined cycle power generation plant according to the first embodiment of the present invention shown in FIG. 1 will be described hereunder.

When the combined cycle power generation plant is in a partial load operation state, the temperature of the exhaust gas G supplied from the gas turbine plant 36 to the exhaust gas heat recovery boiler 39 rises, and with the rise of temperature, the temperature of steam generated from each of the third high pressure superheater 50, the second high pressure superheater 51 and the first high pressure superheater 56 also rises and exceeds a temperature of a driving steam required for the high pressure turbine 44 of the steam turbine plant 37.

However, in the present embodiment, the high pressure evaporator 53 is divided into the second high pressure evaporator 54 and the first high pressure evaporator 55, and further, the first high pressure superheater 56 is provided at the intermediate portion between the two divided high pressure evaporators 54 and 55. In this manner, the degree of superheat of the superheated steam generated from the first high pressure superheater 56 is limited within a range from 10° C. to 20° C. as shown in FIG. 2. In the case where part of the superheated steam generated in FIG. 1 from the first high pressure superheater 56 is supplied to a bypass pipe 67 including a bypass valve 66 as bypass steam, the flow rate of the steam can be reduced, and also, the remaining superheated steam is supplied to the second high pressure superheater 51 so as to make low a temperature of the superheated steam generated from the second high pressure superheater 51. According to a test calculation, the temperature of the superheated steam generated from the first high pressure superheater 56 of the present embodiment is about 100° C., which is lower than the temperature (400° C. or more) of superheated steam generated from the known first high pressure superheater 16 shown in FIG. 6.

Figure 3:
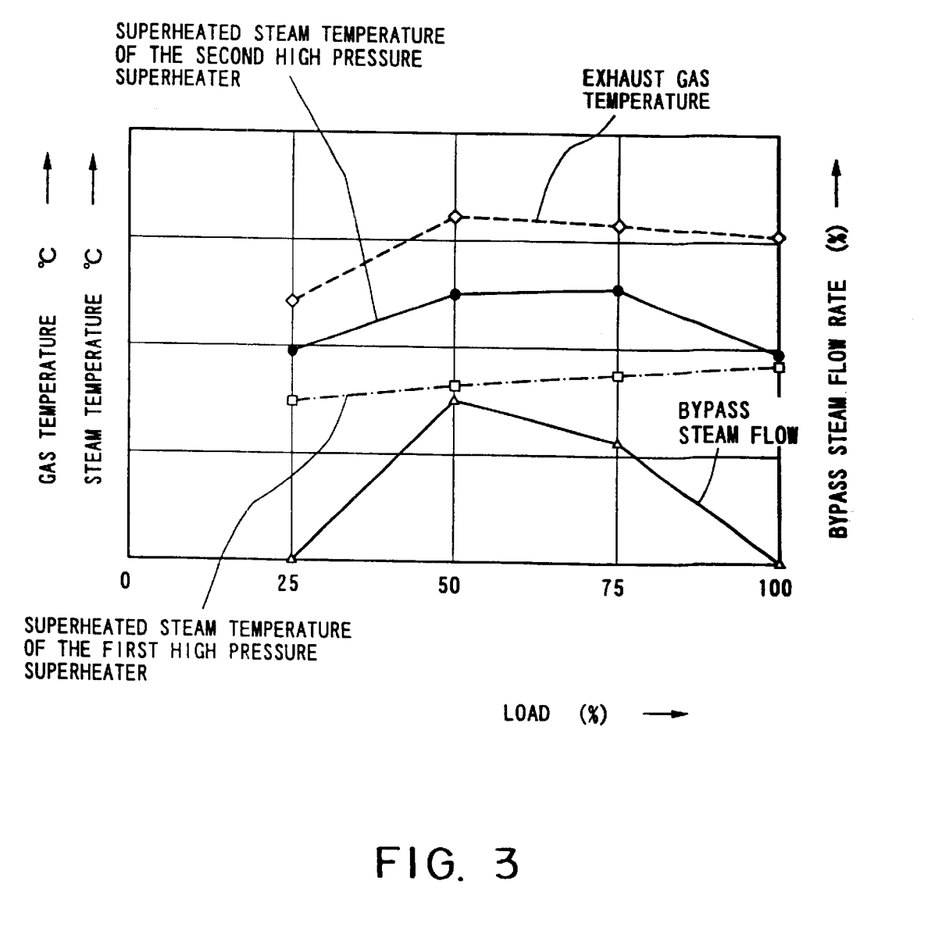
FIG. 3 is a graph showing a steam temperature and a bypass steam flow rate distribution with respect to a load variation obtainable from the present invention.

FIG. 3 is a characteristic chart showing a temperature distribution of the exhaust gas G shown by a broken line, a temperature distribution of the superheated vapor generated from the second high pressure superheater 51 shown by a solid line, a temperature distribution of the superheated steam generated from the first high pressure superheater 56 shown by a dotted chain line, and a bypass steam flow rate shown by a solid line, with respect to a load variation of the gas turbine plant 36.

As seen from FIG. 3, the temperature of the exhaust gas G rises with respect to a load variation of the gas turbine plant 1. However, a temperature of the superheated steam generated from the second high pressure superheater 51 is lowered as compared with the rise of the exhaust gas temperature, and also, a bypass steam flow rate is reduced.

As described above in regard to FIG. 1, the first high pressure superheater 56 generates a superheated steam having a relatively low degree of superheat. Much of the superheated steam is supplied to the second high pressure superheater 51, and then, is supplied to the bypass pipe 67 so that the bypass steam flow rate becomes relatively low. Further, the bypass steam flow is joined together with the superheated steam generated from the second high pressure superheater 51 to lower the temperature of the steam. Subsequently, the low-temperature joined steam is changed into a proper temperature driving steam necessary for a partial load operation by the third high pressure superheater 50, and then, is supplied to the high pressure turbine 44, and thus, the high pressure turbine 44 is driven. The high pressure turbine 44 expands the driving steam so as to drive the generator 40 while joining the exhaust steam with steam generated from the intermediate pressure superheater 57, and then, supplies the joined steam to the gas turbine 43. The joined steam cools the components of the gas turbine 43, and thereafter, is joined with a reheated steam generated from the reheater 48. Further, the joined steam is expanded by the intermediate pressure turbine 45, and thereafter, is supplied to the low pressure turbine 46.

In the present embodiment, the high pressure evaporator 53 is divided into two, that is, the second high pressure evaporator 54 and the first high pressure evaporator 55, and the first high pressure superheater 56 is located at an intermediate portion between these high pressure evaporators 54 and 55. Further, the degree of superheat of the superheated steam generated from the first high pressure superheater 56 is made lower, whereby much of the superheated steam is supplied to the second high pressure superheater 51, so that a relatively little superheated steam can be supplied to the bypass pipe 67 and that a driving steam of a proper temperature can be supplied to the high pressure turbine 44 without providing any temperature reducing means in the third high pressure superheater 50.

At this time, since much of the superheated steam flows through the second high pressure superheater 51, it is possible to provide a uniform temperature distribution such that a thermal stress is almost not generated during heat exchange. Therefore, the material strength of the heat transfer pipe can be maintained for the long term. Further, since little of the superheated steam flows through the bypass pipe 67 as compared with the conventional one, when selecting the bypass valve 66, it is possible to select a valve having a relatively smaller diameter, contributing to a reduction of cost.

In general, since the first high pressure superheater 56 is constructed so that impurities such as silica contained in the saturated steam supplied from the high pressure drum 52 adhere to the heat transfer pipe thereof, the first high pressure superheater 56 has a function of improving the cleanliness of the saturated steam. Thus, when supplying a cooling steam to the components of the gas turbine 43, a cooling steam having a relatively high cleanliness can be supplied thereto, so that the components of the gas turbine 43 can be prevented from being clogged with silica or the like.

Figure 4:
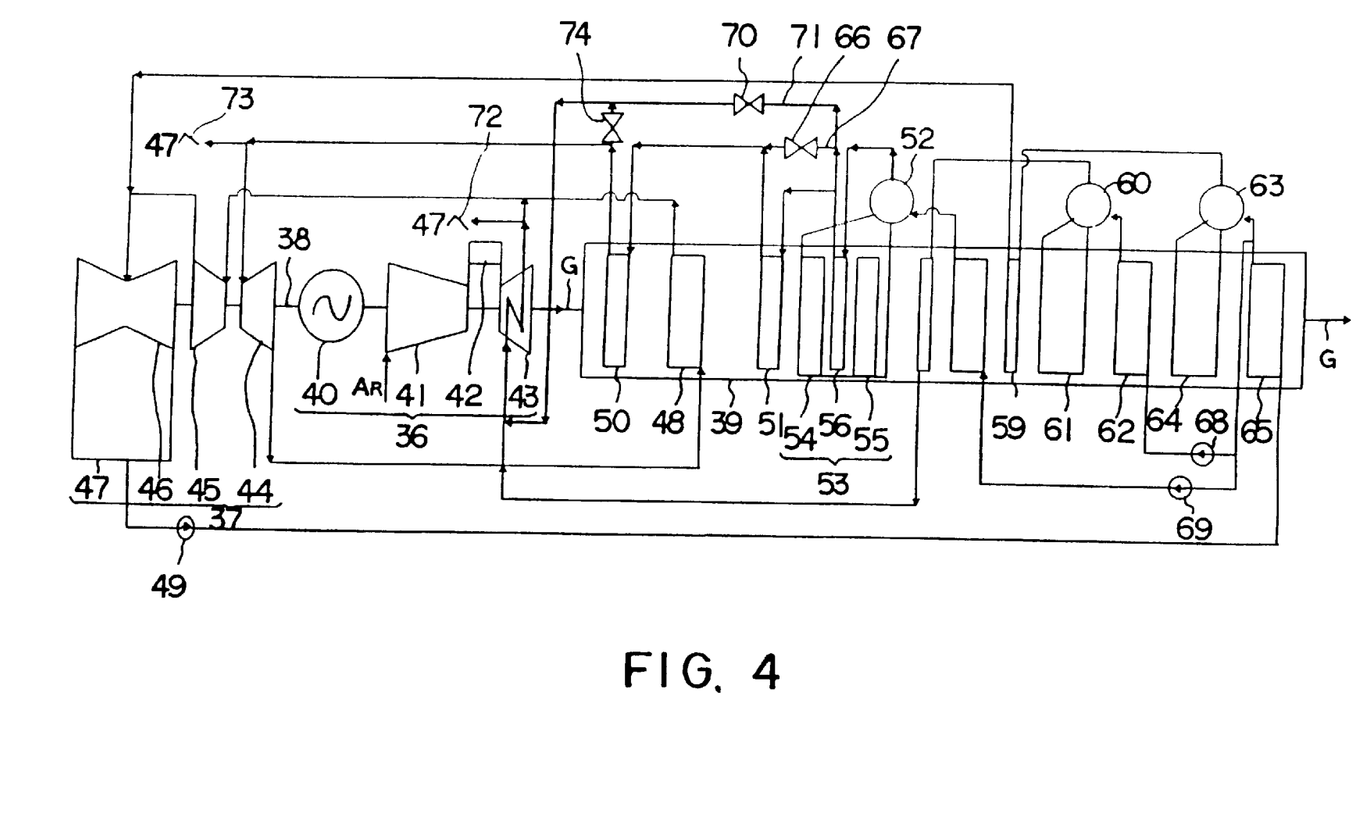
FIG. 4 is a schematic system diagram for explaining a cooling steam supply method of the combined cycle power generation plant according to the present invention.

FIG. 4 is a schematic system diagram showing a cooling steam supply method of a combined cycle power generation plant according to another embodiment of the present invention. For simplification of explanation, like reference numerals are used to designate the same portions as the components of the combined cycle power generation plant shown in FIG. 1.

Prior to an explanation about a cooling steam supply method of a combined cycle power generation plant according to this embodiment, first, the construction will be described below.

The high pressure evaporator 53 is divided into two, that is, the second high pressure evaporator 54 and the first high pressure evaporator 55, and the first high pressure superheater 56 is provided at the intermediate portion between these high pressure evaporators 54 and 55. An outlet side of the first high pressure superheater 56 is provided with a cooling steam pipe 71 between which a control valve 70 connected to an inlet side of the gas turbine 43 is interposed. Further, the outlet side of the gas turbine 43 is provided with a first bypass pipe 72 connected to the condenser 47, and on the other hand, the inlet side of the high pressure turbine 44 is provided with a second bypass pipe 73 connected to the condenser 47.

In the combined cycle power generation plant, a daily start/stop (DSS) operation is frequently carried out unlike a conventional power generation plant. In the case of the DSS operation, the third high pressure superheater 50, the second high pressure superheater 51, the second high pressure evaporator 54 and the first high pressure evaporator 55 which divides the high pressure evaporator 53 into two, are accommodated in the exhaust gas heat recovery boiler 39, and these elements are respectively kept at a warming state before the start-up operation of the exhaust gas heat recovery boiler 39. Further, the residual heat of these elements is at high temperature.

The high pressure drum 52, the intermediate drum 60 and the low pressure drum 63 have a steam pressure of about 60 kg/cm$^2$, 12 kg/cm$^2$ and 4 kg/cm$^2$, respectively.

In the case where a cooling steam is supplied to the components of the gas turbine 43, according to the test calculation taking various losses into consideration, the cooling steam is required to have a steam pressure of 20 kg/cm$^2$. Further, the first high pressure superheater 56 can reduce a degree of superheat of a steam supplied from the high pressure drum 52 from 10° C. to 20° C. Thus, since the first high pressure superheater 56 can set a temperature of the cooling steam to about 300° C. during the hot start-up operation, the cooling steam meets the condition of 350° C. or less cooling steam temperature required for the components of the gas turbine 43. Therefore, the cooling steam can be sufficiently supplied to the gas turbine 43.

The construction of this embodiment is based on the test calculation as described above, and a cooling steam supply method will be described hereunder.

Before the start-up operation of the combined cycle power generation plant, first, the first high pressure superheater 56 supplies the steam of the high pressure drum 52 to the condenser 47 through the second bypass pipe 73 by the second high pressure superheater 51 and the third high pressure superheater 50 so as to blow out impurities such as silica contained in the respective high pressure superheaters 51 and 50. Next, the bypass valve 66 of the bypass pipe 67 is throttled to open the control valve 70 of the cooling steam pipe 71, and then, the steam of the high pressure drum 52 is supplied to the gas turbine 43 as a cooling steam. At this time, in the case where a thermal stress is generated in the components of the gas turbine 43 because the cooling steam temperature is too low, the control valve 74 provided on the outlet side of the third high pressure superheater 50 is opened so that the cooling steam is joined together with the steam of the third high pressure superheater 50, and thus, the joined steam temperature is controlled so that the cooling steam becomes a proper temperature. The cooling steam cools the components of the gas turbine 43, and thereafter, is supplied from the first bypass pipe 72 to the condenser 47, or is discharged from a chimney (not shown) of the exhaust gas heat recovery boiler 39.

When the start-up operation of the gas turbine 43 has been completed and the steam turbine inlet valve is opened, the exhaust steam of the high pressure turbine 44 and the superheated steam of the intermediate pressure superheater 57 are joined together, and then, an operation for cooling the components of the gas turbine 43 is carried out with the use of the joined steam.

According to this method, the steam remaining in the high pressure drum 52 is used, and when the steam is supplied from the first high pressure superheater 56 to the components of the gas turbine 43 as the cooling steam, the cooling steam is controlled so as to become a proper temperature. Thus, even if each heat exchanger of the exhaust gas heat recovery boiler 39 still does not generate a steam, it is possible to cool securely the components of the gas turbine 43, whereby a stable operation of the gas turbine 43 can be carried out.

Figure 5:
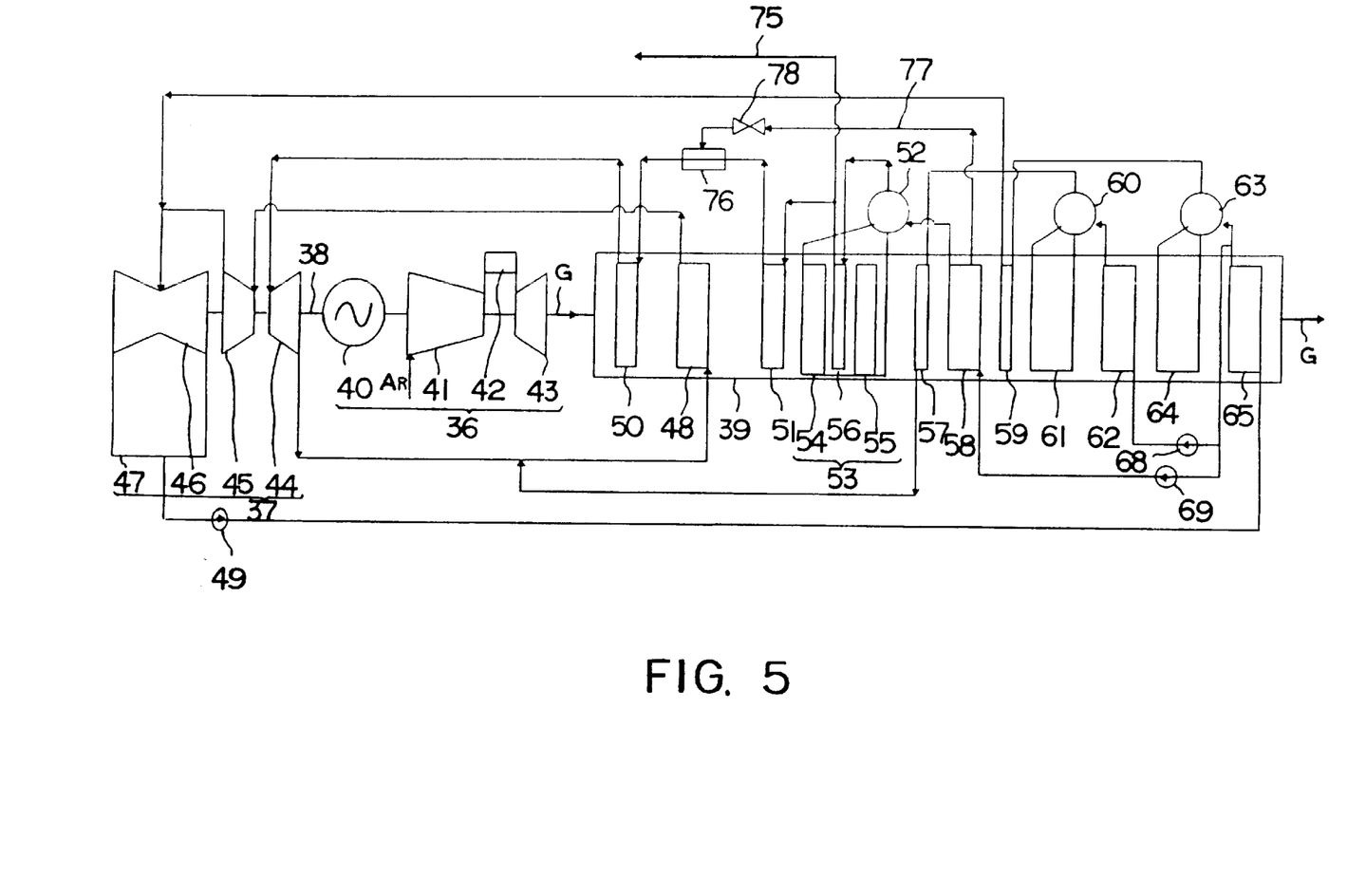
FIG. 5 is a schematic system diagram showing a combined cycle power generation plant according to a second embodiment of the present invention.

FIG. 5 is a schematic system diagram showing a combined cycle power generation plant according to a second embodiment of the present invention. In this second embodiment, like reference numerals are used to designate the same portions as the components used in the first embodiment shown in FIG. 1.

In the second embodiment, the high pressure evaporator 53 is divided into two, that is, the second high pressure evaporator 54 and the first high pressure evaporator 55, and the first high pressure superheater 56 located at the intermediate portion between these evaporators 54 and 55 is provided with a process steam supply pipe 75. Thus, it is possible to supply the steam of the first high pressure superheater 56 to a gasification furnace such as a coal gasification, residual oil gasification plant or the like.

In the combined cycle power generation plant which does not supply a cooling steam from the exhaust gas heat recovery boiler 39 to the components of the gas turbine 43, in the case of making the steam of the third high pressure superheater 50 into a proper temperature driving steam and supplying it to the high pressure turbine 44, the outlet side of the second high pressure superheater 51 is provided with a temperature reducer 76. Then, the steam from the high pressure economizer 58 is supplied from a high-pressure superheater temperature-reducing water pipe 77 to the temperature reducer 76 through a valve 78 which is controlled depending upon the outlet temperature of the second or third high pressure superheater 51 or 50. Further, the superheated vapor temperature of the second high pressure superheater 51 is decreased, and the steam is supplied to the third high pressure superheater 50. For this reason, the superheated steam generated from the first high pressure superheater 56 has a steam pressure of 100 kg/cm$^2$ and a temperature of about 350° C.

In this embodiment, the superheated steam generated from the first high pressure superheater 56 is supplied to a gasification furnace such as a coal gasification plant as process steam, so that the superheated steam generated from the exhaust gas heat recovery boiler can be effectively used. In particular, a gasification power generation plant recently receives much attention, and it is very advantageous in a thermal efficiency calculation if the plant would received a superheated steam generated from the exhaust gas heat recovery boiler.

It is to be noted that the present invention is not limited to the described embodiments and many other changes and modifications may be made without departing from the scope and spirit of the appended claims.

What is claimed is:

1. A cooling steam supply method of a combined cycle power generation plant, comprising a gas turbine plant, a steam turbine plant, a first superheater, an evaporator unit and an exhaust gas heat recovery boiler having a drum, which are operatively connected, in which a cooling steam is supplied from the drum of the exhaust gas heat recovery boiler to the gas turbine plant, said method comprising the steps of:

supplying a steam remaining in the exhaust gas heat recovery boiler to the gas turbine plant during a hot start-up operation thereof;

joining an exhaust steam generated from the steam turbine plant and a steam generated from the exhaust gas heat recovery boiler together after the steam turbine plant starts a ventilating operation; and supplying the joined steam to the gas turbine plant as a cooling steam;

wherein said evaporator unit is divided into two evaporators and said drum is a high pressure drum; and wherein a steam remaining in the high pressure drum is supplied to the first superheater disposed at an intermediate portion between the divided two evaporators and a steam generated from the first superheater is supplied to the gas turbine plant as a cooling steam.

2. A cooling steam supply method according to claim 1, wherein said first superheater joins the steam generated therefrom with a steam generated from a second superheater located on an upstream side of the first superheater when supplying the generated steam to the gas turbine plant as a cooling steam.

3. A cooling steam supply method according to claim 2, wherein the generated steam is supplied through a bypass pipe connected to the first superheater.

4. A cooling steam supply method of a combined cycle power generation plant, comprising a gas turbine plant, a steam turbine plant, an exhaust gas heat recovery boiler including a first superheater, an evaporator unit which is divided into two evaporators, and a high pressure drum, which are operatively connected to each other, in which a cooling steam is supplied from the high pressure drum of the exhaust gas heat recovery boiler to the gas turbine plant via the first superheater disposed at an intermediate portion between the two divided evaporators, said method comprising the steps of:

supplying a steam remaining in the high pressure drum of the exhaust gas heat recovery boiler to the gas turbine plant, through the first superheater, during a hot start-up operation thereof;

joining an exhaust steam generated from the steam turbine plant and a steam generated from the exhaust gas recovery boiler together after the steam turbine plant starts a ventilating operation; and supplying the joined steam to the gas turbine plant as a cooling steam.

5. A cooling steam supply method according to claim 4, wherein said first superheater joins the steam generated therefrom with a steam generated from a second superheater located on an upstream side of the first superheater when supplying the generated steam to the gas turbine plant as a cooling steam.

6. A cooling steam supply method according to claim 5, wherein the generated steam is supplied through a bypass pipe connected to the first superheater.

* * * * *